United States Patent [19]

Stucky

[11] Patent Number: 5,238,338
[45] Date of Patent: Aug. 24, 1993

[54] MACHINING DEVICE OPERATING INSIDE A CANALIZATION

[75] Inventor: Eric Stucky, La Chaux-de-Fonds, Switzerland

[73] Assignee: Canalcrab S.A., La Chaux-de-Fonds, Switzerland

[21] Appl. No.: 613,789

[22] PCT Filed: May 16, 1989

[86] PCT No.: PCT/CH89/00087
§ 371 Date: Jan. 4, 1991
§ 102(e) Date: Jan. 4, 1991

[87] PCT Pub. No.: WO90/14551
PCT Pub. Date: Nov. 29, 1990

[51] Int. Cl.⁵ .............................................. B23C 3/00
[52] U.S. Cl. .................................. 409/143; 166/55.2; 408/138; 408/141
[58] Field of Search ............. 166/55, 55.2, 55.6, 166/55.7; 408/138, 141, 142, 137, 181, 184, 79, 80; 409/143, 201, 204, 215

[56] References Cited

U.S. PATENT DOCUMENTS

| 1,962,961 | 6/1934 | Liedbeck | 166/55.2 |
| 2,066,409 | 1/1937 | Loving et al. | 166/55.2 |
| 4,197,908 | 4/1980 | Davis et al. | 166/55 |
| 4,577,388 | 3/1986 | Wood | 166/55 |
| 4,648,454 | 3/1987 | Yarnell | 166/55.7 |
| 4,890,962 | 1/1990 | Nydegger | 408/138 |
| 4,911,588 | 3/1990 | Ikemoto et al. | 408/138 |
| 4,955,951 | 9/1990 | Nemoto et al. | 166/55.7 |

*Primary Examiner*—Daniel W. Howell
*Attorney, Agent, or Firm*—Townsend and Townsend

[57] ABSTRACT

A machining device is described which, after an old mains conduit has been decontaminated, that is, after it has been covered with a fluid-tight sheath, permits the obstructed secondary branches to be restored from inside the conduit.

This device is made up of two modules, the first mitting the longitudinal and angular positioning of the piercing tool placed on the second module.

A motor permits giving simultaneously the movement of rotation and that of advance of the tool by a set of gears.

11 Claims, 4 Drawing Sheets

MACHINING DEVICE OPERATING INSIDE A CANALIZATION

BACKGROUND OF THE INVENTION

The decontamination and making fluid-tight of old water, gas, or sewer mains are often obtained by application, inside the conduit, of a fluid-tight sheath, of plastic, of resin, or by a lining of fabric coated with resin. This application may be made over several hundreds of meters without a break in continuity. The various inlets of secondary branches or of branches of buildings are then obstructed by the fluid-tight layer deposited. Piercing of said layer from the outside necessitates the opening of the roadway at each building inlet, the dismantling of the inlet, then the piercing of the sheath in order to restore the branch. These operations are extremely expensive and, in addition, pose numerous traffic problems when the branch to be restored is situated under a roadway.

SUMMARY OF THE INVENTION

The device of the present invention permits a piercing, milling, or grinding operation of the layer obstructing the branch, from the inside of the canalization, without its being necessary to open the roadway at that spot.

It is a matter of a device moving longitudinally within the conduit and capable of effecting a piercing right through the canalization, perpendicular to the axis thereof, from the inside toward the outside, after the spot to be pierced has been located and the device has been positioned precisely facing this spot.

DESCRIPTION OF THE PREFERRED EMBODIMENTS

Figure 1:
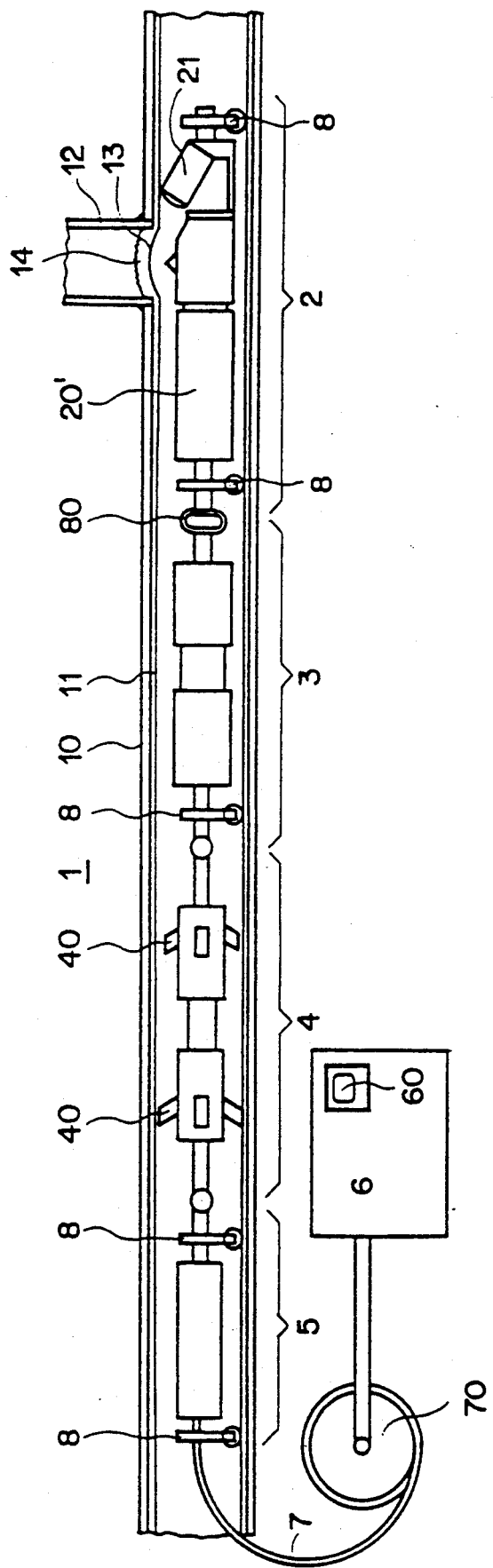
FIG. 1 depicts the set of different modules necessary for effecting the operation.

The canalization 1 depicted in FIG. 1 is made up of a cylindrical conduit 10, which may be of cast iron, of steel, of plastic, of cement, or of Eternit [asbestos cement]; the diameter of such mains pipes is generally between 100 and 250 mm, but nothing hinders the device described here from being able to operate in canalizations of smaller or larger diameter. In order to decontaminate this conduit, an inner lining 11 has been placed according to a process not described here; this lining obstructs the branching of the secondary conduit 12, forming a slight vault-shaped subsidence 13, as well as a plug 14 composed of excess material.

Since the diameter of the canalization limits the size of the equipment that can be placed in it, the equipment and its accessories will have to be disposed lengthwise, along the axis of the conduit. Further, to take longitudinal changes of direction of the canalization into account, they will have to be separated into different relatively short modules, articulated relative to one another.

The sequence of the different modules is made up, according to one embodiment, as depicted in FIG. 1, of a piercing module 2 comprising a tool-holder 20 and a television camera 21, followed by a positioning module 3, then by a traction module 4 and a relieving module 5. The latter is connected to a control desk 6 by a combined cable 7 coming from a cable spool 70 permitting the necessary length of cable to be supplied.

At the ends and between each module, support devices 8, fixed to the modules, comprise three rollers resting on three equidistant points on a circumference of the canalization, so as to permit a longitudinal displacement of the whole of the device, as well as its centering relative to the longitudinal axis of the conduit. The support arms of these rollers are interchangeable, and their length is chosen in order to adapt to the diameter of the conduit to be explored.

The traction module 4 is in conformity with the device described in Swiss patent CH 669,127 and is responsible for propelling the whole of the system from an opening point of the canalization, where the various modules are inserted one after the other, up to a point where the tool-holding spindle 20 of the piercing module 2 is close to the branch to be restored. The movement of the traction module 4 takes place by creeping and leaning on the radial extensors 40, as described in the above-mentioned patent. When the tool-holder spindle 20 has arrived close to the branch to be restored, the traction module 4 will ensure the longitudinal position of the whole of the system by locking itself against the conduit by means of its radial extensors 40.

Figure 2:
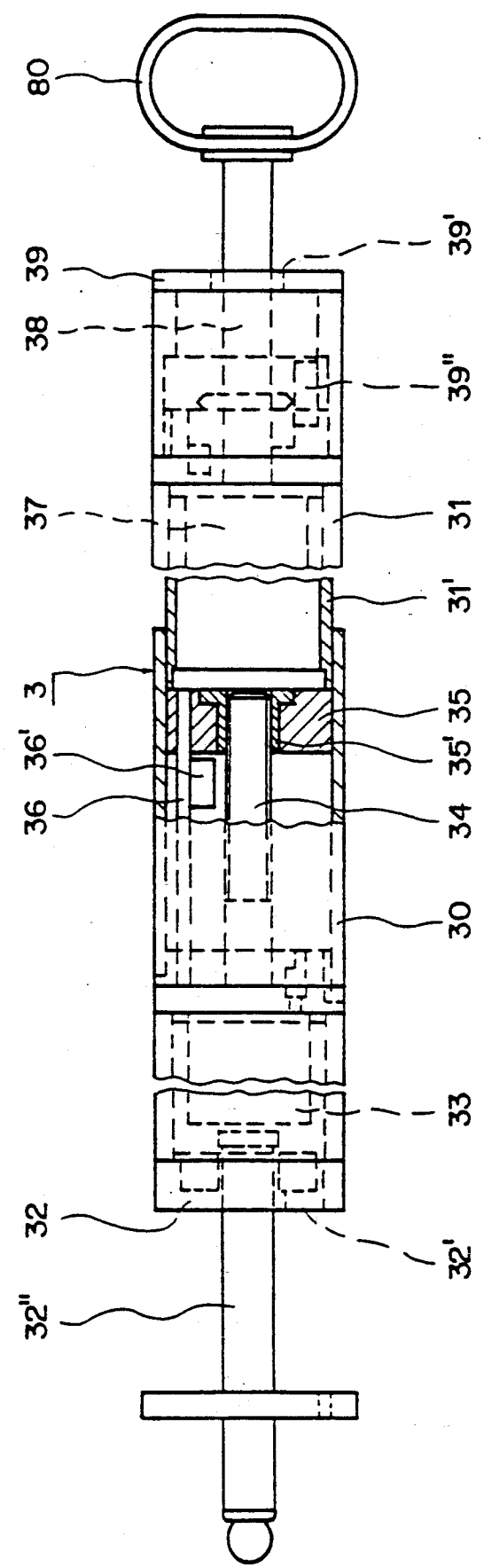
FIG. 2 depicts a longitudinal section of the positioning module.

A more precise positioning of the tool-holder spindle 20, in longitudinal and angular position, is made by the positioning module 3 depicted in FIG. 2. This module is composed of two metal tubes of circular cross-section 30 and 31, the tube 31 comprising a narrowing 31' over part of its length, in such a way that when this narrowing 31' is inserted into the tube 30, there can be relative longitudinal sliding of the two tubes 30 and 31. The end of the tube 30 opposite that where the part 31' of the tube 31 enters is stopped by a lid 32 comprising an aperture 32' for the passage of the control cables, and to which is fixed the coupling device 32" permitting the mechanical connection between this module and the traction module 4.

A reducing motor 33 rotatingly drives a threaded shaft 34 which is fitted in a tapped ring 35' integral with a lid 35, itself fixed to the end of the narrowed part 31' fitted within the tube 30. A decentered shaft 36, integral with the tube 30 and sliding in an aperture of the lid 35, prevents the relative rotation of the two tubes 30 and 31; this decentered shaft 36 supports limit devices 36' restricting the movement of relative extension of the tubes 30 and 31. Thus, through the action of the reducing motor 33, the positioning module 3 is capable of becoming longer or shorter through sliding of the part 31' of the tube 31 within the tube 30.

A second reducing motor 37 rotatingly drives a shaft 38 to which there is fixed the flexible coupling device 80 connecting this positioning module 3 to the piercing module 2. This shaft 38 can rotate within a ring 39' passing through the lid 39 stopping the end of the tube 31. Limit devices 39" restrict the extent of the movement of relative rotation of the shaft 38 in relation to the module 3. Thus, through the action of the reducing motor 37, the shaft 38 and, consequently, all the modules which are coupled thereto, are capable of pivoting in one direction or in another, about the longitudinal axis, relative to the positioning module, which remains fixed.

The two reducing motors 33 and 37 are provided for with electric control, but it is quite possible to alternatively provide for a hydraulic or pneumatic control.

Figure 3:
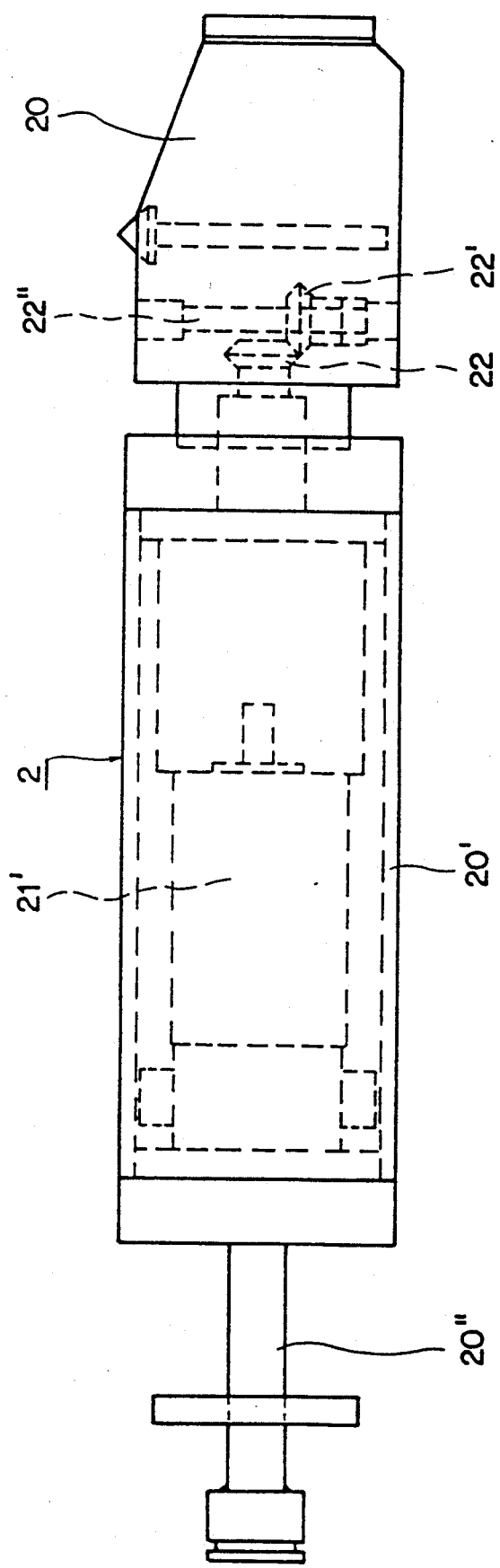
FIG. 3 depicts a longitudinal section of the piercing module.

The piercing module 2, depicted in FIG. 3, is made up of a cylindrical tubular frame 20' having at one of its ends a coupling device 20" integral with the frame 20' and in liaison with the positioning module 3 via the flexible coupling device 80, and supporting at the other end the tool-holder 20.

Figure 4:
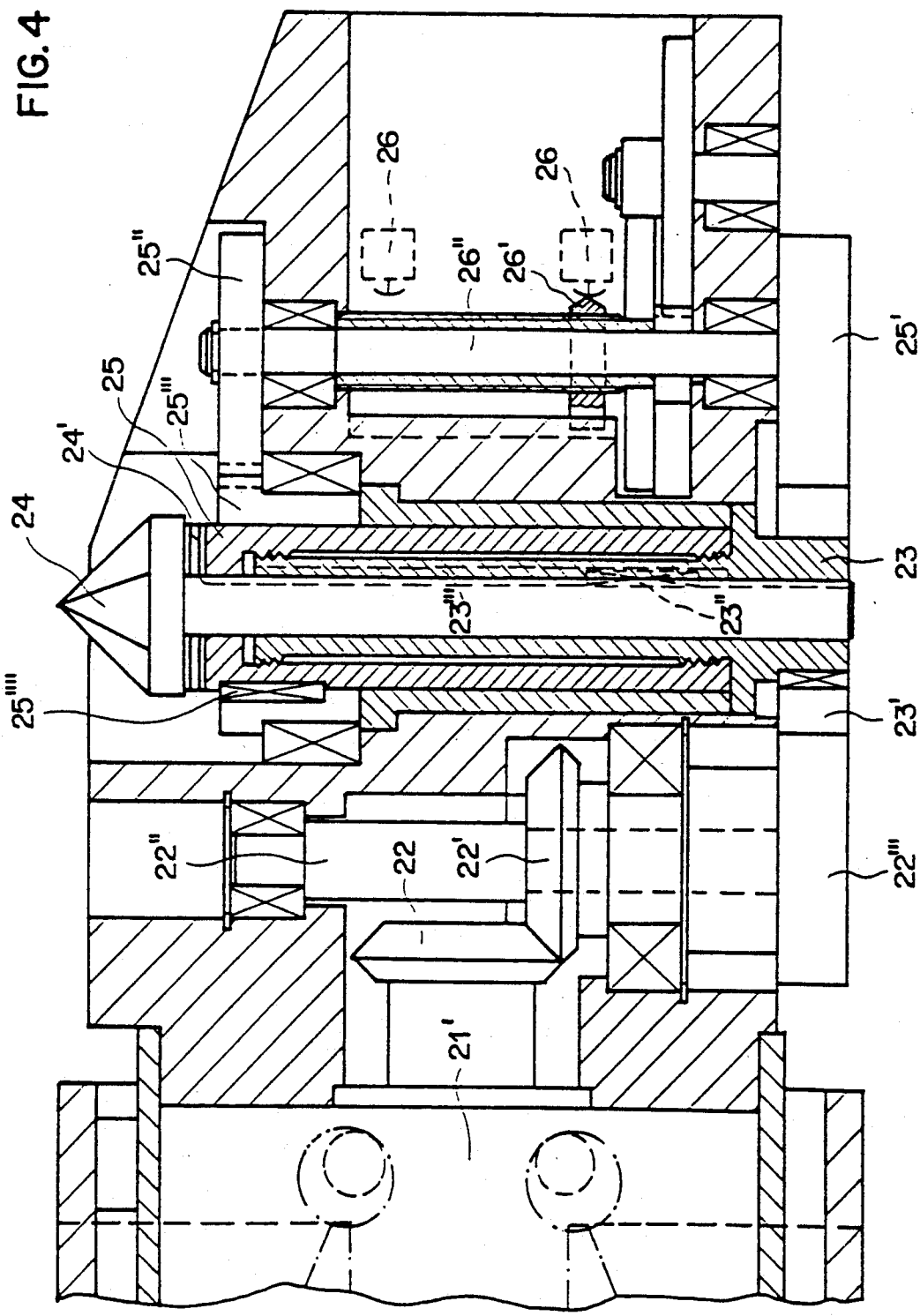
FIG. 4 depicts a section of the tool-holder.

The tool-holder depicted in FIG. 4 comprises a reducing motor 21' driving a train of conical gears 22 and 22'; the latter, being keyed on the shaft 22''', therefore drives the gear 22''''; the gear 23', driven by the gear 22'''', rotatingly drives a threaded sleeve 23 to which it is keyed, which sleeve transmits its rotational movement to the tool 24 via a movable key 23" slidable in the longitudinal slot 23''' contrived inside the threaded sleeve 23. A second sleeve 25, screwed on the sleeve 23, is driven rotatingly by the gears 25', 25", and 25'''; the transmission ratio of these latter is such that the gear 25''', thus the sleeve 25 which it drives via the movable key 25'''', rotates in the same direction as the sleeve 23, but a little less fast, the result is therefore a differential radial movement of the sleeve 25, upward, transmitted to the tool via the needle thrust bearing 24'. The sleeve 25, just like the tool 24, comprises a keyway along its whole length, permitting the movable key 25'''' to drive the sleeve 25 rotatingly as it moves radially. The various rotary elements mentioned above rotate in bearing-blocks or ball bearings integral with the tool-holder 20. Limit contacts 26, actuated by a device 26' moving along the shaft 26" when the latter is rotating, permit the extent of the radial movement of displacement of the tool 24 to be restricted in one direction and in the other. Thus, the rotary movement supplied by the reducing motor 21' is converted into a movement of rotation and of radial advancing of the tool, this in a particularly reduced dimensional geometry made necessary by the small space available having regard to a cross-section of the conduit; this device further permits the transmission of a significant torque to the rotating tool, as well as a pressure stress sufficient to permit the piercing of the fluid-tightness layer. The transmission of the rotational movement to the sleeve 23 taking place at the end opposite the output end of the tool 24 permits a maximum radial extension of the device.

According to a modified embodiment, the driving of the radial advance of the tool 24 relative to the sleeve 23 may take place by sliding of a multi-face exterior machining of the shank of the tool 24 in a corresponding machining of the sleeve 23; in this way, the rotational torque will be transmitted uniformly from the sleeve 23 to the tool 24.

Putting the device to work is relatively simple; the various modules are inserted one after the other through an opening of the conduit, the support devices 8, the rolling diameter of which is adapted to the inside diameter of the conduit to be passed through, being disposed at the provided locations, and the mechanical and electric, or pneumatic or hydraulic, connections being established between each module. Starting up the traction module 4 propels the whole of the device along the conduit, following the progress of the device being feasible in various ways, either by measurement of the length of a tape hooked to the last module and unwound in the course of progress, or by seeking through the roadway with the aid of a radiation transmitter and detector. When the tool 24 proves to be close to the secondary conduit 12 where the branch is to be restored, the traction module 4 is immobilized and is locked against the conduit by control of its radial extensors 40; a television camera 21, equipped with a skimming-light illumination device, searches for the shadow produced by the concavity 13 caused by the obstructed shunt 12. The searching movements of this camera are monitored by a TV screen 60 situated on the control desk 6 and controlled by the action on the positioning module 3; when the tool 24 is just opposite the shunt to be restored 12, control of the piercing module permits the simultaneous starting-up of the rotational movement of the tool, as well as its radial advance. In case the axis of the tool should not be exactly in the axis of the secondary conduit 12, the flexible coupling device 80 disposed between the positioning module 3 and the piercing module 2 permits slight positioning errors to be absorbed.

When the plug 14 obstructing the conduit 12 is pierced all the way through, the tool-advance limit contact 26 controls the reverse rotation of the reducing motor 21', thus permitting retraction of the tool inside the tool-holder 20. In case the tool should jam in the shunt during the piercing operation, it is possible, by sending an overvoltage pulse to the reducing motor 21', momentarily to impose a sufficient torque on the tool in order to permit its unjamming without its being necessary to intervene by outside means in order to recover the device.

The piercing tool may be a conical drill-bit, a milling-cutter, a grinding-wheel, or any other type of tool appropriate to the operation to be effected By unlocking the radial extensors of the traction module 4, and by ordering it to resume its longitudinal advancing, it is possible to pass to the following branch. The totality of the controls, as well as the monitoring of the various sequences of operations necessary for the displacement, fixation, positioning of the device, as well as the machining operations, are grouped on the control desk; some or all of these different controls may be automated. It is therefore thus possible to restore a series of secondary branches rather quickly without its being necessary to open the roadway at multiple locations, this work being carried out by a single man.

I claim:

1. Apparatus for piercing a hole through a canalization tube from inside the tube in a radial direction of the tube, the apparatus comprising a housing movable longitudinally along the tube; a rotary cutting tool including a shaft; first and second, concentric sleeves disposed about the shaft of the tool, rotatably mounted to the housing and oriented in the radial direction; a threaded connection between the sleeves; means rotationally coupled the tool to the first sleeve and permitting relative longitudinal movements between the tool and the first sleeve in the radial direction; drive means including a single motor for rotating the first sleeve and therewith the cutting tool in a cutting direction and, simultaneously therewith, for generating relative rotational movement between the first and second sleeves so that the threaded connection of the sleeves causes the second sleeve to move in the radial direction towards the tube; and radial force transmitting means disposed between the second sleeve and the tool for transmitting the relative radial movement of the second sleeve to the tool to thereby advance the tool movements of the tool induced by the motor cause the piercing of the tube wall.

2. Apparatus according to claim 1 wherein the means for rotationally coupled comprises a key and groove connection between the first sleeve and the cutting tool permitting relative axial movements between the first sleeve and the tool.

3. Apparatus according to claim 1 wherein the means for rotationally coupling comprises a multi-face, radially inwardly oriented surface on the first sleeve and a correspondingly shaped, radially outwardly oriented, multi-face surface on the cutting tool shaft which rotationally couple the shaft to the sleeve while permitting relative axial movements therebetween.

4. Apparatus according to claim 1 wherein said single motor of the driving means is selected from the group of motors consisting of electric motors, pneumatic motors, and hydraulic motors.

5. Apparatus according to claim 1 wherein the single motor comprises a reversible motor so that rotation of the cutting tool in the first direction causes the advancement of the tool towards the tube and rotation of the cutting tool in the opposite direction causes axial movement of the cutting tool away from the tube.

6. Apparatus according to claim 1 wherein the cutting tool is selected from the group consisting of conical drill bits, milling cutters, and grinding wheels.

7. Apparatus according to claim 1 including a positioning module for placement in the tube and adapted to move longitudinally along the tube, and a coupler connecting the positioning module with the housing for longitudinally moving the housing relative to the tube by activating the positioning module.

8. Apparatus according to claim 7 wherein the piecing module includes means for varying the length of the piercing module, and wherein the positioning module further includes means for pivoting its ends with respect to each other in opposite directions about a longitudinal axis of the positioning module, and wherein the coupler connects the positioning module with the housing for moving the housing both longitudinally along the tube and rotationally about its axis.

9. Apparatus according to claim 8 including a first motor for the means for varying the length of the positioning means and a second motor for the pivot means, the first and second motors being selected from the group consisting of electric motors, pneumatic motors, and hydraulic motors.

10. Apparatus according to claim 8 wherein the coupler includes a flexible coupling device.

11. Apparatus for piercing an underground, tubular canalization liner for establishing communication between an interior of the liners and a canalization branch line, the apparatus comprising a positioning module advanceable longitudinally along the liner; a piercing module coupled to the positioning module and including a rotary cutter extensible in a radial direction relative to the liner for piercing through the liner after the positioning module has aligned the cutter with the branch line, the piercing module comprising:

(a) a housing;
(b) a first sleeve rotatably mounted to and axially immovable relative to the housing;
(c) means for mounting the cutter inside the first sleeve so that the cutter rotates with the first sleeve and can move relative to the first sleeve in an axial direction thereof;
(d) a second sleeve disposed concentrically about the first sleeve and a threaded connection between the sleeves so that relative rotational movements between the sleeves result in corresponding movements of the second sleeve relative to the first sleeve and the housing in the axial direction;
(e) means permitting relative rotational movements between the second sleeve and the cutter and transmitting movements in the axial direction of the second sleeve relative to the first sleeve to the cutter;
(f) a single drive motor; and
(g) transmission means operatively coupled the single drive motor with the first and second sleeves for simultaneously rotating the sleeves in a cutting direction and for simultaneously generating a differential rate of rotation for the sleeves selected to result in movements of the second sleeve, and therewith of the cutter in the axial direction towards the liner so that the combined rotational and axial movements of the cutter pierce the hole at the branch line.

* * * * *